United States Patent
Zou et al.

(10) Patent No.: US 11,321,312 B2
(45) Date of Patent: May 3, 2022

(54) VECTOR-BASED CONTEXTUAL TEXT SEARCHING

(71) Applicant: ALEX—Alternative Experts, LLC, Chantilly, VA (US)

(72) Inventors: Joel Chi Zou, Alexandria, VA (US); Aaron Ennis Aldridge, Triangle, VA (US); James Cesar Rosa, Arlington, VA (US)

(73) Assignee: ALEX—Alternative Experts, LLC, Chantilly, VA (US)

( * ) Notice: Subject to any disclaimer, the term of this patent is extended or adjusted under 35 U.S.C. 154(b) by 332 days.

(21) Appl. No.: 16/247,383

(22) Filed: Jan. 14, 2019

(65) Prior Publication Data

US 2020/0226126 A1     Jul. 16, 2020

(51) Int. Cl.
*G06F 7/00*       (2006.01)
*G06F 17/30*      (2006.01)
*G06F 16/242*     (2019.01)
*G06F 16/2457*    (2019.01)
*G06F 40/289*     (2020.01)

(52) U.S. Cl.
CPC ...... *G06F 16/243* (2019.01); *G06F 16/24578* (2019.01); *G06F 40/289* (2020.01)

(58) Field of Classification Search
CPC .................. G06F 16/243; G06F 40/289; G06F 16/24578; G06F 40/284; G06F 16/3347
USPC ........................................................ 707/728
See application file for complete search history.

(56) References Cited

U.S. PATENT DOCUMENTS

| | | | |
|---|---|---|---|
| 6,976,207 B1 * | 12/2005 | Rujan | G06K 9/6269 |
| | | | 707/999.005 |
| 7,689,411 B2 | 3/2010 | Sandor et al. | |
| 7,788,251 B2 | 8/2010 | Carlson et al. | |
| 7,809,551 B2 | 10/2010 | Sandor et al. | |
| 7,831,559 B1 | 11/2010 | Mohan et al. | |
| 8,122,016 B1 | 2/2012 | Lamba et al. | |
| 8,560,532 B2 | 10/2013 | Lamba et al. | |
| 8,620,905 B2 | 12/2013 | Ellsworth et al. | |
| 8,719,257 B2 | 5/2014 | Rangan | |
| 8,880,515 B2 | 11/2014 | Lamba et al. | |
| RE46,973 E | 7/2018 | Mohan et al. | |
| 2010/0287148 A1 * | 11/2010 | Resnick | G06F 16/93 |
| | | | 707/706 |

(Continued)

OTHER PUBLICATIONS

Arora, S. et. al. "A Simple but Tough-to-Beat Baseline for Sentence Embeddings", Conference paper at ICLR 2017.

(Continued)

*Primary Examiner* — Binh V Ho (57) ABSTRACT

A text vectorizer is provided to compute vectors for respective text units. The text vectorizer computes a given vector for a given text unit by: (i) computing word vectors for respective words in the text unit; (ii) computing phrase vectors for respective phrases in the text unit; and (ii) combining the word vectors and the phrase vectors to produce the given vector for the given text unit. For a corpus of documents, the text vectorizer computes corpus vectors for the respective corpus documents. Search text is received, and, based thereon, the text vectorizer computes a search vector for the search text. Search scores are then computed for respective corpus documents by comparing the search vector with the corpus vectors of the respective corpus documents.

6 Claims, 8 Drawing Sheets

(56) References Cited

U.S. PATENT DOCUMENTS

| | | |
|---|---|---|
| 2014/0004027 A1 | 1/2014 | Jurng |
| 2016/0012044 A1 | 1/2016 | Franceschini et al. |
| 2016/0012045 A1 | 1/2016 | Franceschini et al. |
| 2016/0012057 A1 | 1/2016 | Franceschini et al. |
| 2016/0012058 A1 | 1/2016 | Franceschini et al. |
| 2016/0012092 A1 | 1/2016 | Franceschini et al. |
| 2016/0012106 A1 | 1/2016 | Franceschini et al. |
| 2016/0012119 A1 | 1/2016 | Franceschini et al. |
| 2016/0012122 A1 | 1/2016 | Franceschini et al. |
| 2016/0012125 A1 | 1/2016 | Franceschini et al. |
| 2016/0012126 A1 | 1/2016 | Franceschini et al. |
| 2016/0012336 A1 | 1/2016 | Franceschini et al. |
| 2016/0093050 A1* | 3/2016 | Kim ............... G06V 10/20 382/128 |
| 2016/0336006 A1* | 11/2016 | Levit ............... G10L 15/14 |
| 2018/0004752 A1* | 1/2018 | Deng ............... G06F 16/93 |
| 2018/0203848 A1* | 7/2018 | Perez ............... G10L 25/30 |
| 2018/0268023 A1* | 9/2018 | Korpusik ............ G06N 5/022 |
| 2018/0285459 A1* | 10/2018 | Soni ............... G06F 16/93 |
| 2018/0315440 A1* | 11/2018 | Inaba ............... G06N 20/00 |
| 2019/0034801 A1* | 1/2019 | Sodhani ............ G06N 20/10 |
| 2019/0102400 A1* | 4/2019 | Kumaran ........... G06F 16/355 |
| 2019/0197105 A1* | 6/2019 | Tagra ............... G06F 40/30 |
| 2019/0221204 A1* | 7/2019 | Zhang ............... G06N 3/08 |
| 2019/0251721 A1* | 8/2019 | Hua ............... G06N 3/08 |
| 2019/0294695 A1* | 9/2019 | Stoyanovsky ....... G06F 16/36 |
| 2020/0050662 A1* | 2/2020 | Bhat ............... G06F 40/295 |
| 2020/0394458 A1* | 12/2020 | Yu ............... G06V 10/25 |
| 2020/0410365 A1* | 12/2020 | Cheung ............ G06N 3/084 |

OTHER PUBLICATIONS

Mikolov, T., et. al. Distributed Representations of Words and Phrases and their Compositionality, arXiv:1310.4546, 2013.

Bojanowski, P. et. al. "Enriching Word Vectors with Subword Information", Transactions of the Association for Computational Linguistics, vol. 5, pp. 135-146, 2017.

Rohini K. Srihari et. al., "Contextual Information Retrieval using Concept Chain Graphs", ceur-ws.org 2005, 12 pages (https://pdfs.semanticscholar.org/321e/1bca5f71aba3a8714059b61a26cfe7202217.pdf).

"Unsupervised Learning of Sentence Embeddings using Compositional n-Gram Features", Proceedings of NAACL-HLT 2018, pp. 528-540, 2018. http://www.aclweb.org/anthology/N18-1049.

"Information Retrieval for Short Documents", 2006, https://slideheaven.com/information-retrieval-for-short-documents.html.

"Text similarity by using GloVe word vector representations", 2017. https://riunet.upv.es/bitstream/handle/10251/90045/SÁNCHEZ%20-%20Similitud%20de%20textos%20haciendo%20uso%20de%20representaciones%20vectoriales%20de%20las%20palabras.pdf?sequence=1.

"Vector Space Models of Lexical Meaning", 2014, https://www.cl.cam.ac.uk/~sc609/pubs/sem_handbook.pdf.

* cited by examiner

VECTOR-BASED CONTEXTUAL TEXT SEARCHING

BACKGROUND

Document searching has long been a common computing task. Given a corpus of documents and given some search text that specifies desired information, the goal of document searching is to identify the documents in the corpus that are most relevant to the search text. While the form of the documents and the search text can vary, as can the notion of relevance, the general idea is to retrieve the pieces of information (e.g., documents) that are most likely to bear on the search text.

Prior techniques that have focused merely on the standalone statistical properties of words, for instance TF-IDF, have been inadequate because they fail to capture word similarities. Such techniques may also fail to account for misspellings and spelling variations of a same word. While traditional search techniques such as keyword searching are often adequate for literal word searching and may even allow for spelling variations, these approaches often have not recognized polysemic terms (words having multiple orthogonal meanings). More generally, for large corpuses—which are increasingly common—simple word-based searching algorithms often miss relevant results and include irrelevant results.

In view of these shortcomings and others, a variety of techniques based on artificial intelligence (AI) and natural language processing (NLP) have been applied to the search problem. Most of these newer techniques have relied on the use of auxiliary structures such as controlled vocabularies (dictionaries and thesauri) and ontologies. Controlled vocabularies and ontologies allow broader terms, narrower terms, and related terms to be incorporated into user queries. Controlled vocabularies are one way to overcome some of the limitations of Boolean keyword queries. Additional auxiliary structures of general interest, such as the large synonym sets of WordNet (a concept model based on auxiliary structures), have been implemented by reusing retrieval models and data structures of classical information retrieval. However, this approach involves complex algorithms for segmentation, reorganization and linking. Later approaches have implemented grammars to expand the range of semantic constructs.

There remains a need for text searching that is efficient, able to account for spelling variations, and yet able leverage the power of deep contextualized word representations.

SUMMARY

The following summary is included only to introduce some concepts discussed in the Detailed Description below. This summary is not comprehensive and is not intended to delineate the scope of the claimed subject matter, which is set forth by the Claims presented below.

A text vectorizer is provided to compute vectors for respective text units. The text vectorizer computes a given vector for a given text unit by: (i) computing word vectors for respective words in the text unit; (ii) computing phrase vectors for respective phrases in the text unit; and (ii) combining the word vectors and the phrase vectors to produce the given vector for the given text unit. For a corpus of documents, the text vectorizer computes corpus vectors for the respective corpus documents. Search text is received, and, based thereon, the text vectorizer computes a search vector for the search text. Search scores are then computed for respective corpus documents by comparing the search vector with the corpus vectors of the respective corpus documents.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
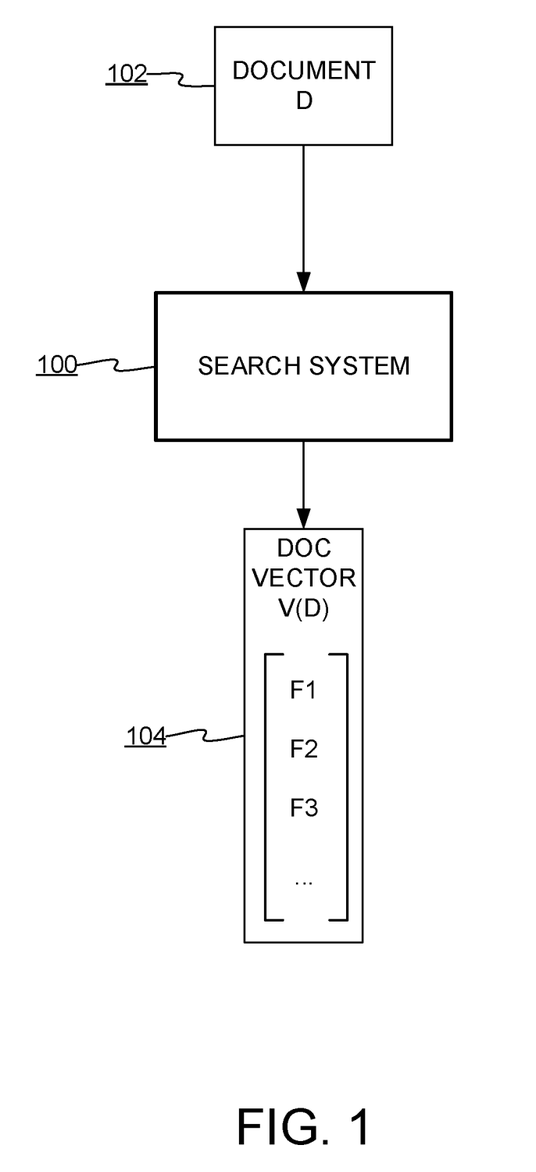
FIG. 1 shows an overview of a vector-based search system.

FIG. 1 shows an overview of a vector-based search system 100. The search system 100, described in detail below, is configured to receive an arbitrary document 102 and produce a document vector 104. The document 102 may be in any form such as a file, an item in a database, a web page, and so forth. The search system 100 is configured to parse the form of the document 102. The substantive content of the document 102 is not important, although ordinary structure such as words, sentences, and paragraphs may be assumed. While the term "document" is a convenient example of document structure, the embodiments described herein may operate on other discrete units of text such as pages, fixed-size blocks, or other text units, possibly within a containing structure such as a standard document. The term "document" as used herein also refers to such other units of defined and addressable text. Furthermore, although embodiments described herein may refer to documents as having sentences, "sentence" as used herein is also a term of convenience and generally refers to phrases or other coherent sequences of multiple related words found within a document, whether defined by document structure, grammatic or semantic rules, punctuation, etc.

The document vector 104 is a concise numeric description of the content of the document 102. The document vector 104 is a vector in a vector space where fields correspond to features of the document. Most or all of the fields in the document vector 104 will be real numbers that predict how likely it is that the document 102 has the corresponding feature. However, some fields may be metadata about documents per se (e.g., document properties, access counts, manual labels, etc.). As discussed below, most of the fields of the document vector may be generated by a neural network. Although the meaning of specific features or fields generated by a neural network may be unknown, all document vectors generated by the search system 100 are in the same vector space, that is, each like field in each document vector quantifies the same document feature. Thus, document vectors can be meaningfully operated on, for instance they may be meaningfully added, subtracted, and more significantly, a distance may be computed between two document vectors and that distance will reflect the closeness of the contents of the documents represented by the document vectors, at least in terms of the model used and the fields it generates.

Figure 2:
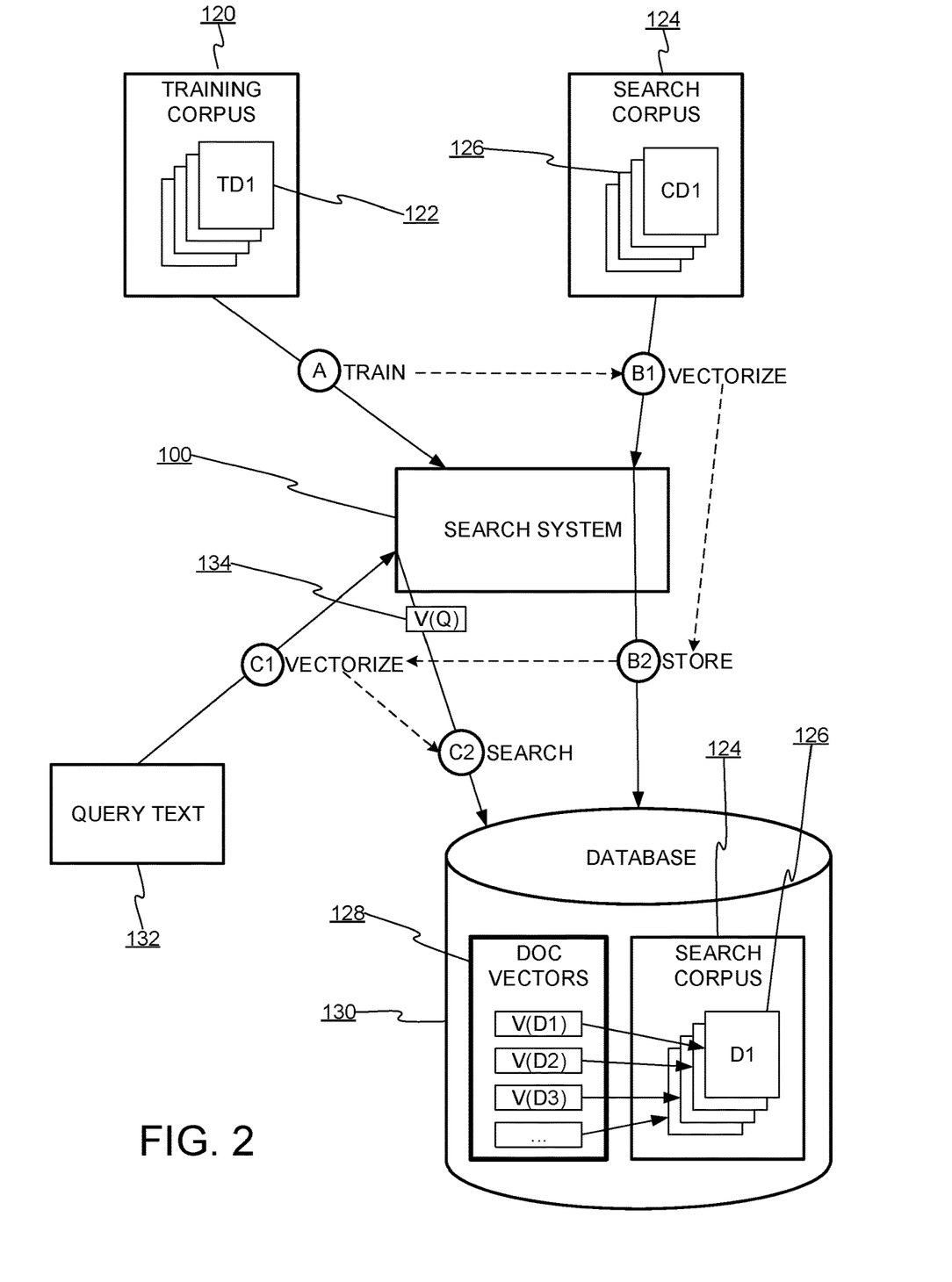
FIG. 2 shows training and use of the search system.

FIG. 2 shows training and use of the search system 100. Initially, at step A, the search system 100 is trained with a training corpus 120 of training documents 122. The training documents 122 is preferable a large number of documents. Although there is no specific number of documents, the more documents that are used, the higher the quality of the outputs of the search system. The training documents may be from any source, including publicly available datasets. If available, it may be preferable to use a training corpus whose documents have relevance for the search material, however, any sufficiently large diverse training corpus in the appropriate language will suffice, although the more domain-relevant words that are in the training text, the better the model will learn to represent those words. As addressed below, the training involves parsing each training document, preprocessing to remove stopwords and the like, breaking the text in the training document into constituent parts (e.g., words), and passing the parts through the word based model and sub-word based neural network models which capture cumulative statistical properties of the training corpus.

At step B1 in FIG. 2, once the search system 100 has been trained, a search corpus 124 of search documents 126 is vectorized by the search system 100. The search documents 126 are the documents will ultimately be searched and evaluated for relevance to user queries. Each search document 126 is preprocessed and passed through the trained search system, which vectorizes the search document. That is, the search system produces a search document vector 128 that represents linguistic and contextual features of the search document according to the search system's trained state. In one embodiment, the vectorization of a search document may include vectoring sub-parts of the document, e.g. paragraphs, pages, etc. The overall score is calculated using the top-N related pages, because some documents are relevant but may contain many pages of boilerplate information that can lower a score. As noted above, a search document's vector may also include metadata related to the search document that is not derived from a trained neural network, such as file properties, usage information, descriptive metadata, and so forth.

At step B2, the search document vectors 128 and the search corpus 126 are stored in a database 130 for future use. A database is convenient for storing this information, however, the use of a database is not necessary. Any mechanism for efficiently storing and retrieving the search document vectors and search documents will suffice. Links between the search document vectors and their respective search documents are also stored. If sub-parts are vectorized, those vectors and links between the respective sub-parts are also stored.

After training and processing the search corpus, the search system 100 is ready to perform user searches. A search begins with a user submitting query text 132. The query text 132 may be an entire document, a manually inputted query string, a selected portion of a document, and so forth. For convenience, the query text will sometimes be referred to as a query document, with the understanding that other forms of query text besides documents per se may be used.

At step C1 the query text 132 is preprocessed and vectorized by the search system 100, producing a search vector 134. At step C2 the search vector 134 is used to search the search corpus 124. As noted above, the search vector 134 and the search document vectors 128 are in the same vector space. For each search document vector, a similarity between the search document vector and the search vector 134 is computed. Based on the links from the search document vectors to the search documents, these similarities serve as the basis for scoring or ranking the search documents and presenting results accordingly, as discussed below.

Figure 3:
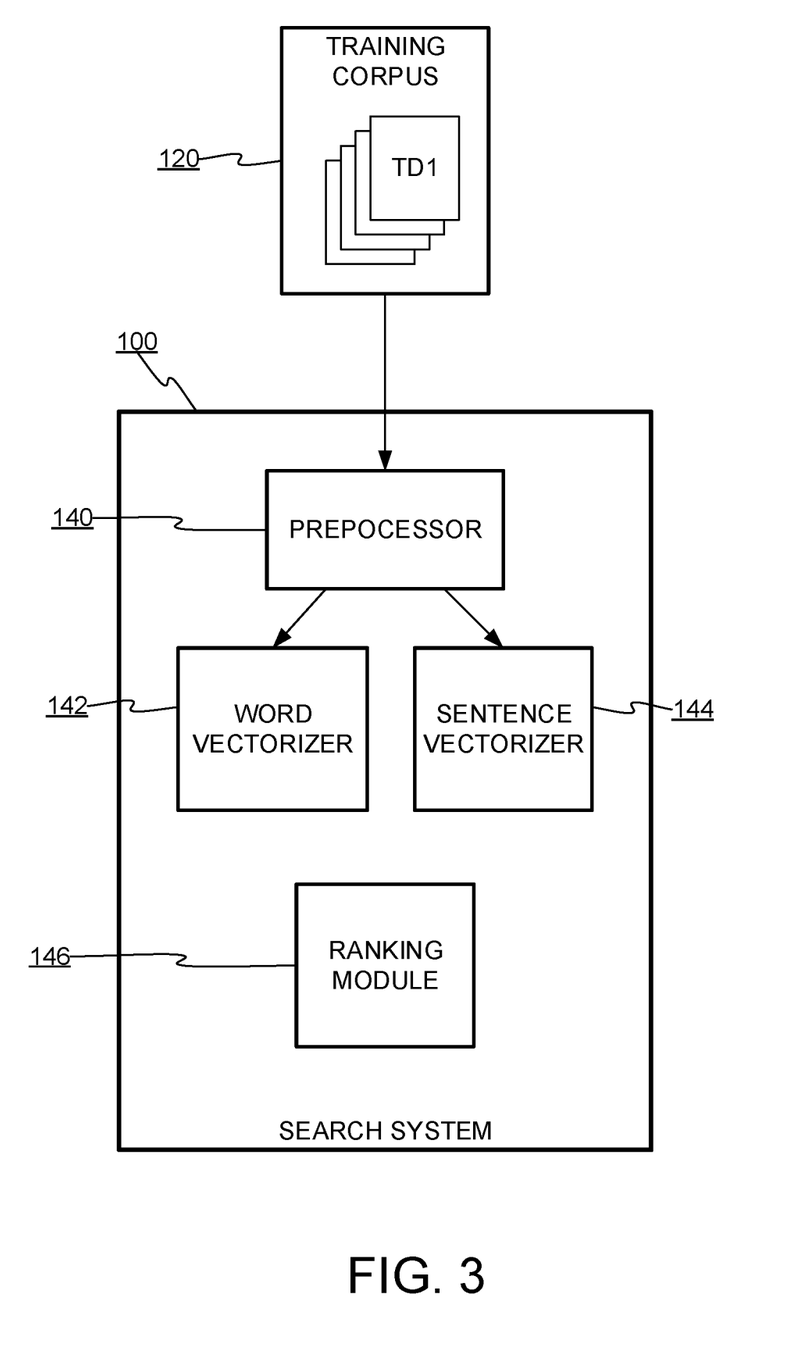
FIG. 3 shows details of the search system.

FIG. 3 shows details of the search system 100. The search system includes a preprocessor 140 which preprocesses each incoming document. Preprocessing may include functions such as detecting words in the document that are determined to match any word in a predefined set of common stopwords. Preprocessing may also remove non-alphanumeric words, i.e., text that does not conform to a predefined alphabet of characters. It may also be helpful to transform any encountered digits to zero to help limit the vocabulary of the search system. Various punctuation characters may also be removed. In one embodiment, words that consist of a number of characters below some threshold (e.g. one or two) may also be discarded because they do not add sufficient information to the search system. The preprocessing may also involve tokenizing the document. As mentioned above, preprocessing is preferably performed on each document processed by the search system, whether it be for training documents, search documents, or query text/documents.

When the document has been preprocessed it is passed to two different components of the search system; a word vectorizer 142 and a sentence vectorizer 144. As discussed below with reference to FIG. 4, in practice the vectorizers will be unsupervised neural networks that learn using back-propagation, however other machine learning algorithms may be used if the capture the relevant properties of the documents. The word vectorizer produces a word vector for each word in the document. Preferably, as discussed below, the word vectorizer 142 captures character-level information about each of the words in the document. The sentence vectorizer produces a sentence vector for each sentence in the document. Preferably, as also discussed below, the sentence vectorizer captures information about the context of words in the document (i.e., word embeddings), which can be used to generate sentence vectors. In sum, for a given document, the search system 100 produces word vectors and sentence vectors, which captures properties of the document of the given document at different levels of granularity. Then, as explained below with reference to FIG. 7, the vectors are synthesized or combined to produce a document vector for the given document.

The search system 100 also includes a ranking module 146, which is described below with reference to FIG. 6. In brief, the ranking module compares a query vector of a query document to the search document vectors 128

Figure 4:
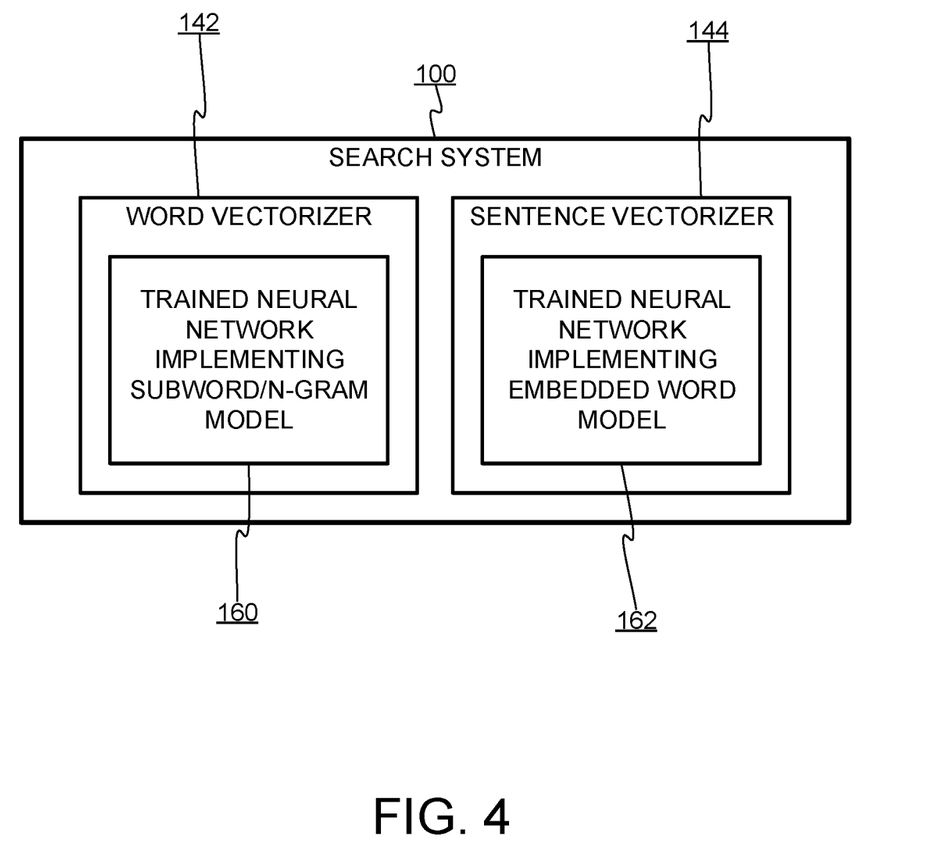
FIG. 4 shows detail of an embodiment of the search system that uses unsupervised neural networks.

FIG. 4 shows detail of an embodiment of the search system 100 that uses unsupervised neural networks. The word vectorizer 142 may include a first neural network 160 that implements an n-gram or subword model 160, and a second neural network 162 that implements a word or sentence embedding model. When a word is passed to the first neural network, sliding windows of various lengths are used to break down the word into its n-gram subwords. To learn the vector representation of each subword and the whole word, the negative sampling technique is used in which a context window is defined around the current subword/word and the words inside the window are chosen along with noise words randomly sampled from the corpus.

Then, the model tries to classify each word if they are actually in the context window of the word. Finally, the parameters of the model are adjusted in the direction to fix mistakes in the prediction. The first neural network outputs a subword vector for each respective subword. The word vectorizer may then combine the subword vectors of the word to generate a word vector. The word vector represents contextual information about the word but at the character level.

Similarly, the second neural network implements a word or sentence embedding model. In one embodiment, each sentence of the document being processed by the search system is vectorized by passing the words of the sentence to the second neural network 162. The second neural network 162 outputs respective word vectors, which the sentence vectorizer 144 combines to form the sentence vector. Although not shown in FIG. 4, the search system 100 also includes logic to generate a document vector for the document being vectorized based on the document's word vectors and sentence vectors.

Figure 5:
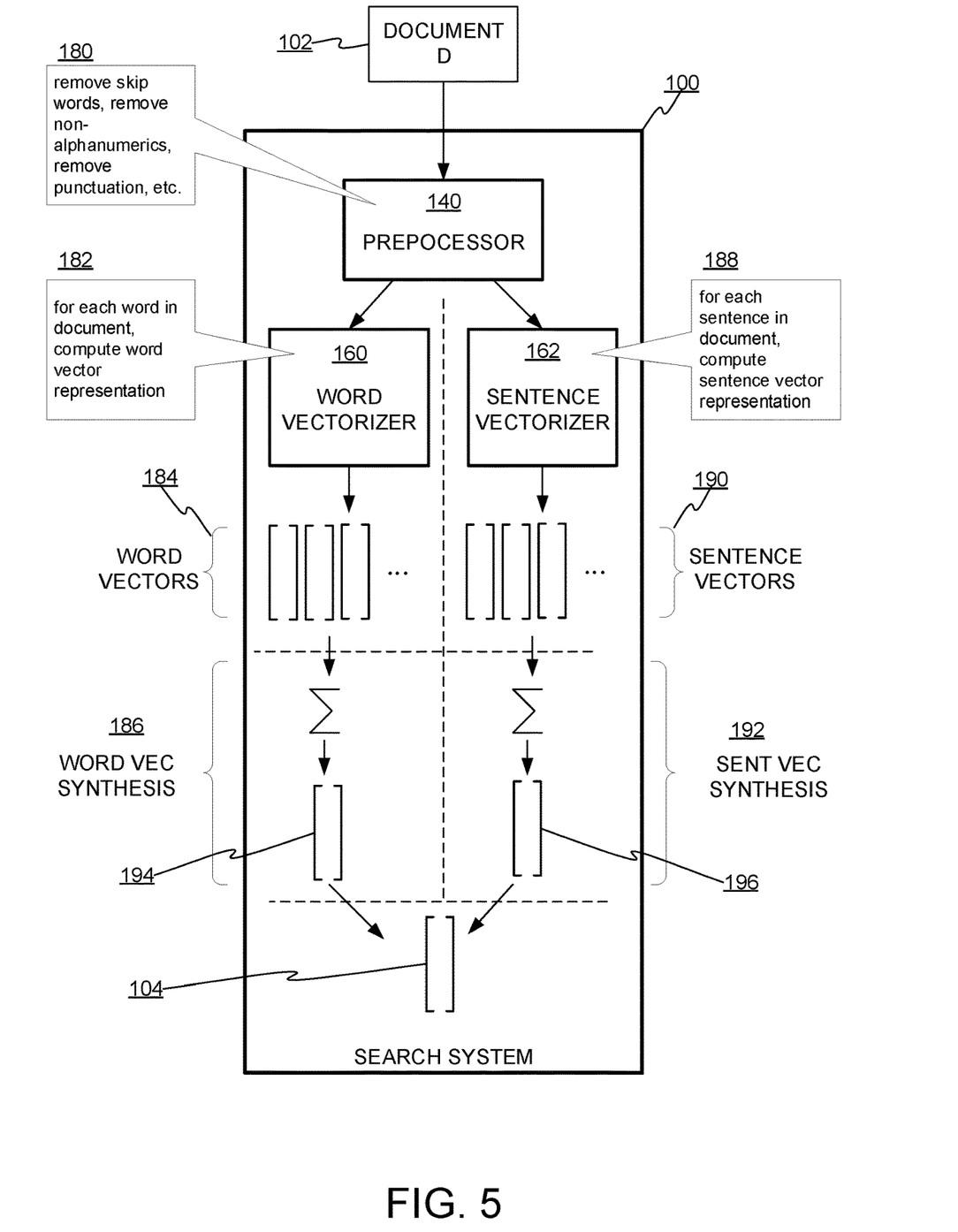
FIG. 5 shows details of how a document is vectorized into a document vector.

FIG. 5 shows details of how a document 102 is vectorized into a document vector 104. The preprocessor 140 performs a step 180 of removing skip words and other functions discussed above. At step 182 the word vectorizer 160 takes each word in the document 102 and outputs a corresponding word vector 184. The word vectorizer the performs a word vector synthesis step 186. The word vector synthesis may be as simple as averaging the word vectors 184. However, more sophisticated syntheses may be performed. For example, word vectors may be upweighted or downweighted according to properties such as frequency, manually defined weights, external weighting signals, etc. In one embodiment, vectors of frequent words are downweighted to allow less frequent (and presumably more meaningful) words to have more influence. In another embodiment, the common vector direction across all of the words is removed.

At step 188 the sentence vectorizer 162 takes each sentence in the document 102 and outputs respective sentence vectors 190. The sentence vectorizer 162 then performs a sentence vector synthesis step 192. The sentence vector synthesis step 192 synthesizes or combines the sentence vectors 192 into a single sentence vector. Again, a simple averaging may be used, however other ways of combining the sentence vectors may be used. The averaging to the top-n most relevant pages can be limited to emphasize documents that have a very relevant section.

Finally, the search system 100 synthesizes the synthetized word vector 194 and the synthesized sentence vector 196 to form the document vector 104 that is generated by the search system 100. A tuning parameter may be provided to control relative contributions of the synthesized word vector 194 and the synthesized sentence vector 196.

Figure 6:
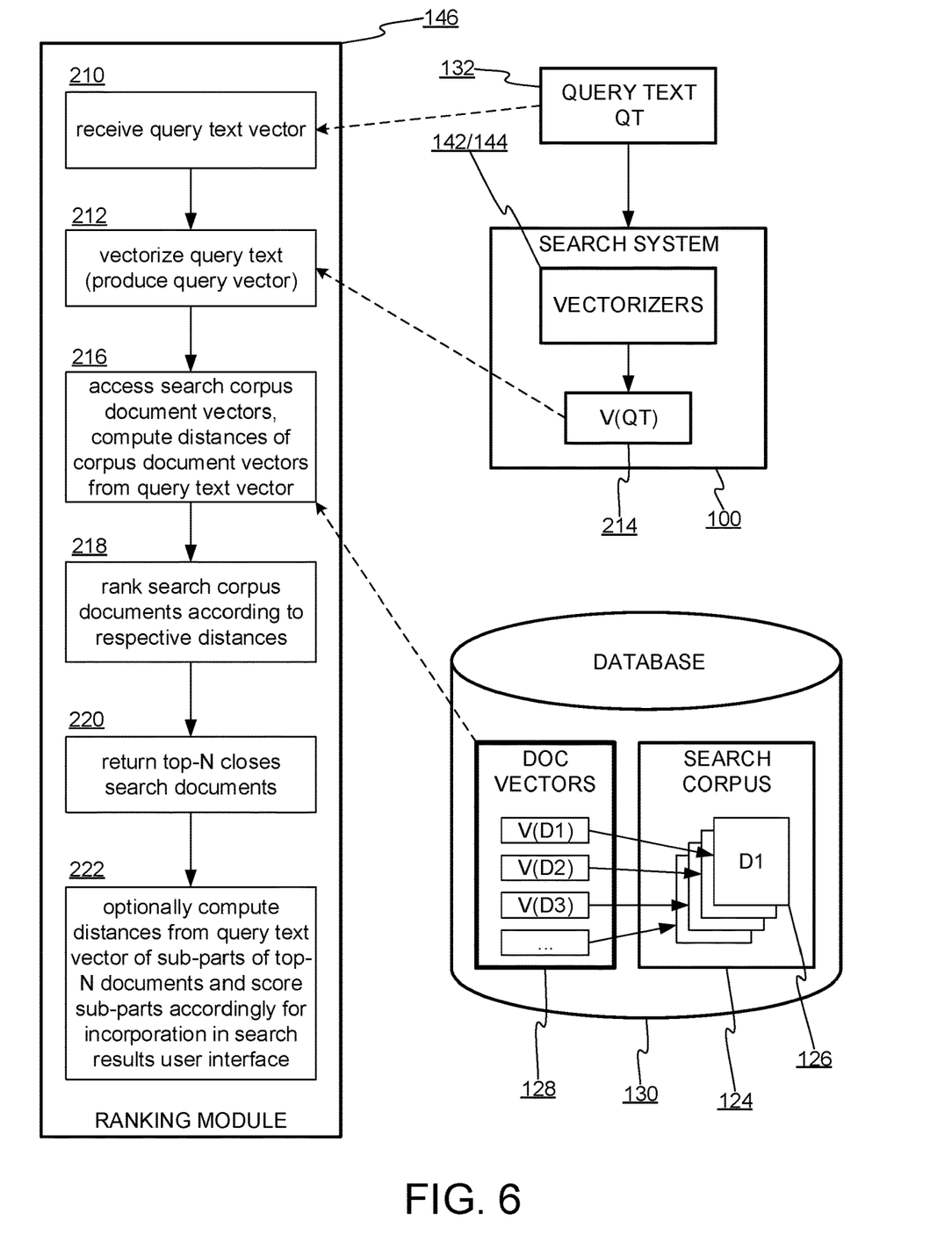
FIG. 6 shows how the search system performs a search using a ranking module.

FIG. 6 shows how the search system 100 performs a search using the ranking module 146. At step 210 a query text 132 is received by the search system 100. The query text is specified by a user and may be a phrase inputted by a user, a user selection of text in a document, a link to a query document, and so forth. At step 212 the query text is vectorized by the vectorizers 142/144 to generate a query vector 214. At step 216 the search document vectors 128 are accessed. For each search document vector, a distance from the query vector 214 is computed. That is, each search document 126 (as represented by its vector) in the search corpus 124 has a respective distance from the query text 132 (as represented by its vector), and the distances reflect the varying degrees of congruity between the network-modeled features of the query text and the search documents.

In some embodiments, not all search documents 126 are evaluated at step 216. The documents that are searched may be selected or filtered by a preliminary search step. For example, the search documents may be first searched by another algorithm, for instance a keyword-matching algorithm. A Boolean filter may be applied to the metadata of the search documents so that only a specified subset of the search documents is evaluated. For a significantly large search corpus, search results may be outputted as the search is being performed and a time cut-off might cut short the search before all search documents have been evaluated.

For whichever search documents are searched, at step 218 the search documents are ranked according to their respective distances. At this ranking step, other factors may be incorporated into the ranking scores. For example, ranking scores may be scaled according to how frequently they have teen used, document metadata, or other factors besides vector distance. In other words, the vector distances may be just one factor that goes into computing ranking scores.

At step 220 the search documents with the top-N scores are selected and returned as a search result. The search results may be in a variety of known forms such as a search engine results page listing results from most to least relevant, a user interface showing indicia of the top-N documents, an ordered list of graphic representations of all the search documents, with each document representation rendered to reflect its document's score (e.g., shade, text indicating the numeric score, etc.). Any known method for presenting search results may be used.

In one embodiment, a step 222 is performed to compute distances of sub-parts of the top-N search documents from the query text 132. This may involve using the vectorizing modules to compute sub-document vectors for whichever unit of document sub-parts is being used. For example, paragraphs, pages, sections, fixed-size blocks, and other parts of a top-N search document may be vectorized in the same way that entire documents are vectorized. Distances of these sub-part vectors from the query text vector 214 are computed. When a top-N document is displayed in a search result (e.g., at a client device using the search system), the graphic display of the document (or a reduced/thumbnails version) may include graphics to indicate the scores of the document's subparts. This may allow the user to quickly jump to the subparts of the document that are most relevant to the query text 132.

Figure 7:
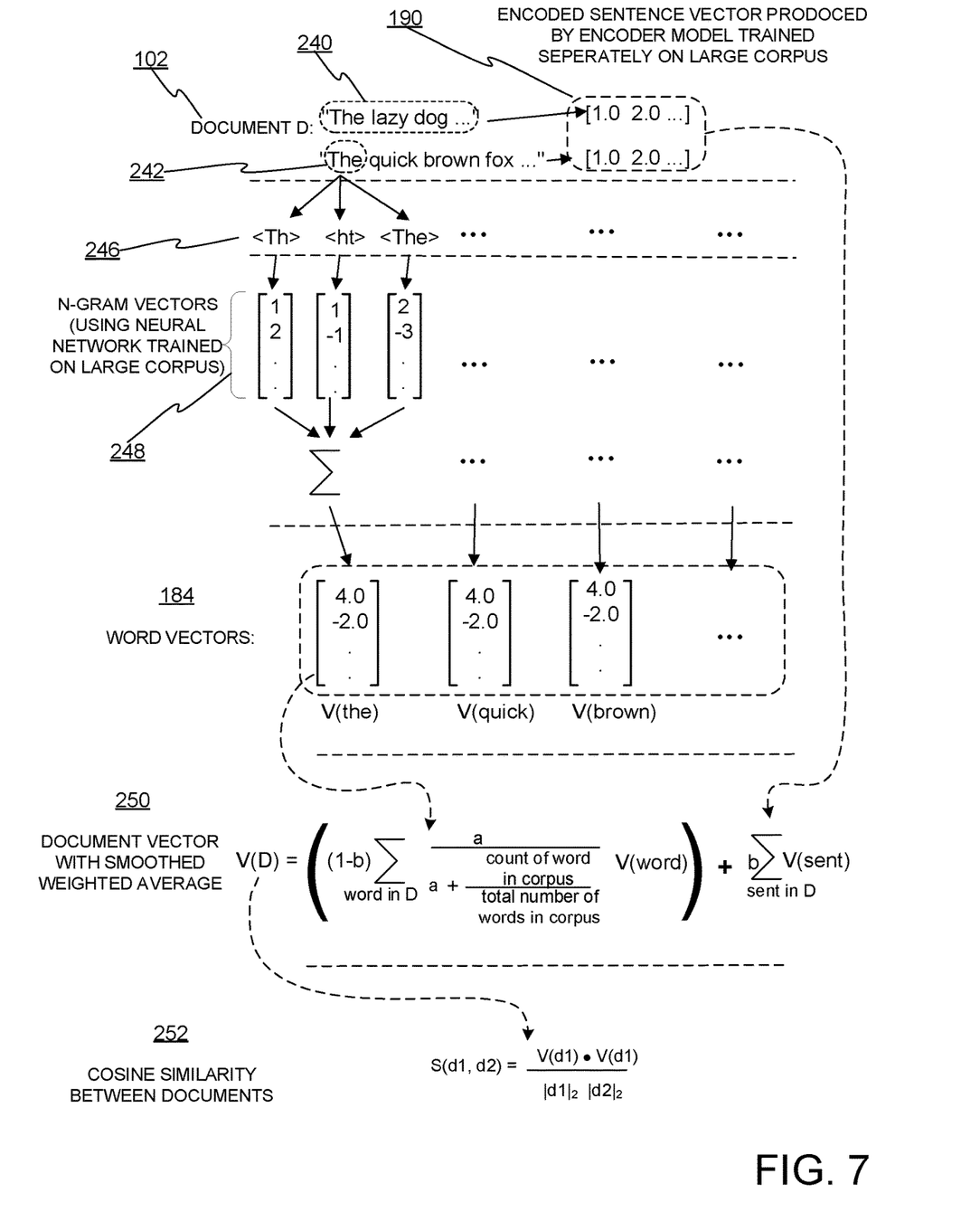
FIG. 7 shows vectorizing and distance-computing details of an embodiment.

FIG. 7 shows vectorizing and distance-computing details of an embodiment. The document 102 inputted to the search system includes sentences 240 and words 242. The sentence vectorizer 144 generates a sentence vector 190 for each sentence, as discussed above. The words of the document 102 are also vectorized by the word vectorizer 142. Specifically, a word such as "The" is divided into n-grams 246. The n-grams are passed through the first neural network, which outputs an n-gram vector 248 for each n-gram of the word being processed. The n-gram vectors for each word are synthesized (e.g., averaged) to form word vectors 184 for the respective words of the document 102.

At this point, the system has two sets of vectors; the word vectors 184, and the sentence vectors 190. A final synthesis function 250 combines the two sets of vectors. The synthesis function includes a first term for the word vectors. The first term sums the word vectors 184, weighting each word vector according to its inverse frequency in the training corpus. The second term of the synthesis function averages the sentence vectors 190. Note that for brevity FIG. 7 does not show the denominators for averaging, i.e., the total word and sentence counts of the document for the first and second terms, respectively.

Finally, when a search is performed, a similarity function 252 is used to compute the distances between the query vector and the search document vectors (and possibly subpart vectors). Any known vector-distance formula may be used, for example the cosine familiarity function, as shown in FIG. 7.

Figure 8:
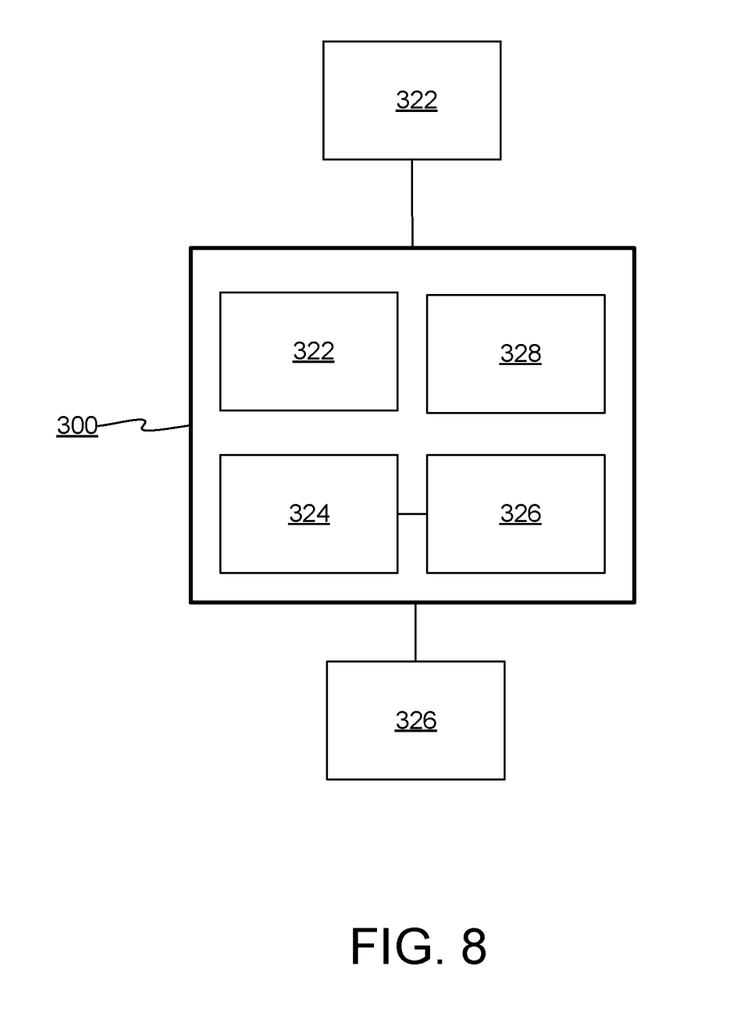
FIG. 8 shows details of a computing device on which embodiments described herein may be implemented.

FIG. 8 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device or host 300 (possibly via cloud APIs) to implement the embodiments described herein. The embodiments may be implemented on a stand-alone single computing device, a client-server system of cooperating computing devices, a cloud service, or combinations thereof.

The computing device or host 300 may have one or more displays 322, a network interface 324 (or several), as well as storage hardware 326 and processing hardware 328, which may be a combination of any one or more of: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device or host 300 may cooperate in ways well understood in the art of machine computing. In addition, input devices may be integrated with or in communication with the computing device or host 300. The computing device or host 300 may have any form-factor or may be used in any type of encompassing device. The computing device or host 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A computing device comprising:
processing hardware; and
storage hardware storing instructions configured to, when executed by the processing hardware, cause the processing hardware to perform a process, the process comprising:
using a first trained neural network to compute document vectors for respective corpus documents in a corpus that is to be searched, wherein each corpus document vector is computed by: computing corpus word vectors for respective words in the corresponding document, computing corpus sentence vectors for respective sentences in the corresponding document, and computing a corpus document vector for the corresponding corpus document based on the corpus sentence vectors and the corpus word vectors;
receiving a query comprising query sentences comprised of query words, and based thereon: using the first trained neural network to compute query word vectors for the respective query words, using a second trained neural network to compute query sentence vectors for the respective query sentences, and computing a query vector based on the query word vectors and the query sentence vectors; and
ranking documents in the corpus by computing distances of the corpus document vectors from the query vector, respectively;
wherein for a given word inputted to the first trained neural network, the first trained neural network outputs subword vectors for respective subwords of the given word, and wherein a word vector for the given word is generated by computing a summation of the subword vectors.

2. A computing device according to claim 1, wherein the first trained neural network comprises character-level information about words in a corpus that trained the first neural network, and wherein the subword vectors comprise character-level features of the given word.

3. Computer-readable storage hardware storing instructions configured to cause a computing device to perform a process, the process comprising:
training a first neural network on an unlabeled training corpus comprising training text, the first neural network modeling character embeddings in the training corpus;
training a second neural network on the unlabeled training corpus, the second neural network modeling word embeddings in the unlabeled training corpus;
for a search corpus comprised of units of text, computing a unit vector for each respective unit of text, wherein a unit vector is computed by (i) providing words of the unit of text to the first neural network and generating first vectors according to vector outputs of the first neural network, (ii) providing words of the unit of text to the second neural network and generating second vectors according to vector outputs of the second neural network, and (iii) synthesizing the first vectors and second vectors to form a unit vector representing the unit of text, wherein the first and second neural networks model different respective levels of structure of the unit of text;
storing search information comprising the units of text and the respective unit vectors, wherein each unit vector is linked to its respective unit of text;
providing the stored search information to a ranking module that uses the search information to compute rankings of the units of text for search queries; and displaying search results comprising the rankings;

wherein the levels of structure comprise a first level and a higher second level, wherein the first vectors are positioned within a vector space such that corresponding elements of text at the first level that share a common context in the training corpus are located in proximity to one another elements of text at the second level.

4. Computer-readable storage hardware storing instructions configured to cause a computing device to perform a process, the process comprising:

training a first neural network on an unlabeled training corpus comprising training text, the first neural network modeling character embeddings in the training corpus;

training a second neural network on the unlabeled training corpus, the second neural network modeling word embeddings in the unlabeled training corpus;

for a search corpus comprised of units of text, computing a unit vector for each respective unit of text, wherein a unit vector is computed by (i) providing words of the unit of text to the first neural network and generating first vectors according to vector outputs of the first neural network, (ii) providing words of the unit of text to the second neural network and generating second vectors according to vector outputs of the second neural network, and (iii) synthesizing the first vectors and second vectors to form a unit vector representing the unit of text, wherein the first and second neural networks model different respective levels of structure of the unit of text;

storing search information comprising the units of text and the respective unit vectors, wherein each unit vector is linked to its respective unit of text;

providing the stored search information to a ranking module that uses the search information to compute rankings of the units of text for search queries; and displaying search results comprising the rankings;

wherein an algorithm for computing the unit vectors is also used to compute a search vector of text of a query, and wherein rankings of the units of text are computed according to distances of the search vector from the unit vectors.

5. Computer-readable storage hardware according to claim 4, wherein the algorithm comprises a first neural network that implements an n-gram model and a second neural network that implements a word and/or sentence context model.

6. Computer-readable storage hardware storing instructions configured to cause a computing device to perform a process, the process comprising:

training a first neural network on an unlabeled training corpus comprising training text, the first neural network modeling character embeddings in the training corpus;

training a second neural network on the unlabeled training corpus, the second neural network modeling word embeddings in the unlabeled training corpus;

for a search corpus comprised of units of text, computing a unit vector for each respective unit of text, wherein a unit vector is computed by (i) providing words of the unit of text to the first neural network and generating first vectors according to vector outputs of the first neural network, (ii) providing words of the unit of text to the second neural network and generating second vectors according to vector outputs of the second neural network, and (iii) synthesizing the first vectors and second vectors to form a unit vector representing the unit of text, wherein the first and second neural networks model different respective levels of structure of the unit of text;

storing search information comprising the units of text and the respective unit vectors, wherein each unit vector is linked to its respective unit of text;

providing the stored search information to a ranking module that uses the search information to compute rankings of the units of text for search queries; and displaying search results comprising the rankings;

wherein the synthesizing the first vectors and second vectors comprises finding a first average of the first vectors and finding a second average of the second vectors.

* * * * *